(12) United States Patent
Crooks

(10) Patent No.: US 7,756,783 B2
(45) Date of Patent: Jul. 13, 2010

(54) FRAUD CLEARINGHOUSE

(75) Inventor: Theodore J. Crooks, San Diego, CA (US)

(73) Assignee: Fair Isaac Corporation, Minneapolis, MN (US)

( * ) Notice: Subject to any disclaimer, the term of this patent is extended or adjusted under 35 U.S.C. 154(b) by 0 days.

(21) Appl. No.: 11/515,323

(22) Filed: Sep. 1, 2006

(65) Prior Publication Data

US 2007/0192240 A1    Aug. 16, 2007

Related U.S. Application Data

(60) Provisional application No. 60/714,032, filed on Sep. 2, 2005.

(51) Int. Cl.
*G06Q 40/00* (2006.01)

(52) U.S. Cl. .......................................... 705/39; 705/35
(58) Field of Classification Search .................. 705/35, 705/39, 44
See application file for complete search history.

(56) References Cited

U.S. PATENT DOCUMENTS

| 5,819,226 | A * | 10/1998 | Gopinathan et al. ........... 705/44 |
| 5,966,695 | A * | 10/1999 | Melchione et al. ............ 705/10 |
| 6,629,135 | B1  | 9/2003  | Ross, Jr. et al. |
| 6,866,586 | B2  | 3/2005  | Oberberger et al. |
| 6,873,977 | B1  | 3/2005  | Aggarwal et al. |
| 6,907,408 | B2  | 6/2005  | Angel |
| 7,004,382 | B2  | 2/2006  | Sandru |
| 7,076,652 | B2  | 7/2006  | Ginter et al. |
| 7,103,579 | B1  | 9/2006  | Phillips et al. |
| 2002/0198806 | A1 * | 12/2002 | Blagg et al. ................... 705/35 |
| 2004/0019543 | A1 * | 1/2004  | Blagg et al. ................... 705/35 |
| 2004/0019568 | A1 * | 1/2004  | Moenickheim et al. ....... 705/64 |
| 2004/0177035 | A1 * | 9/2004  | Silva ............................ 705/39 |
| 2005/0154665 | A1 * | 7/2005  | Kerr ............................. 705/35 |
| 2006/0149674 | A1 * | 7/2006  | Cook et al. ................... 705/44 |
| 2007/0156837 | A1 * | 7/2007  | Elgar et al. .................. 709/208 |

FOREIGN PATENT DOCUMENTS

| KR | 2000-59113  | 10/2000 |
| KR | 2002-89834  | 11/2002 |
| KR | 2003-76764  | 9/2003  |
| KR | 2004-12138  | 2/2004  |

* cited by examiner

*Primary Examiner*—James A Kramer
*Assistant Examiner*—Hao Fu
(74) *Attorney, Agent, or Firm*—Fish & Richardson P.C.

(57) ABSTRACT

A method includes obtaining from a first financial organization first information relating to a first financial account indicative of financial performance for the first financial account, obtaining from a second financial organization independent of the first financial organization second information relating to a second financial account indicative of financial performance for the second financial account, and determining if the first financial account and the second financial account relate to a common customer.

17 Claims, No Drawings

FRAUD CLEARINGHOUSE

This application claims the benefit under 35 U.S.C. §119 (e)(1) of prior U.S. provisional application 60/714,032, filed Sep. 2, 2005, which is incorporated herein in its entirety.

TECHNICAL FIELD

This document relates to computerized systems and methods for detecting fraud across multiple organizations, such as by using a central clearinghouse that determines whether applications for credit and the like originate from legitimate applicants or instead originate from fraudsters.

BACKGROUND

Over the last dozen years, credit card fraud has become a more difficult business for fraudsters. Once far and away the greatest fraud problem for banks, credit card fraud has been brought under control and further progress is to be expected. Though overall losses have grown modestly in most developed economies, the rate of fraud loss compared to card use has dropped sharply due to improved security measures, especially systems that monitor account activity for out-of-character, suspicious behavior. Further progress is expected from the widespread introduction of electronic cards implementing secure personal identification numbers (PINs).

But, fraudsters have adapted with new forms of fraud, spreading losses across a wider span of accounts and types of transactions.

SUMMARY

The system proposed here is designed to reduce the diversification and renewed growth of fraud by expanding the scope of successful behavior-monitoring methods from single accounts to all accounts under single consumers, households, or other organizations. Fraudsters have evaded protections by moving beyond the current field of view, in many situations. By sharing information on account behavior at the national level, across financial institutions and selected consumer services, that field of view can be expanded to once again bring fraud into focus and under control.

Expansion of electronic authorization to nearly all debit and credit card transactions combined with real-time monitoring of those authorizations for suspicious account behavior has delivered a blow to organized fraud. Independent of passwords and PINs, tamper-resistant cards and law enforcement stings, behavior monitoring has been the essential, last line of defense protecting card-based payment systems.

Behavior monitoring for fraud relies upon the common sense once applied by bank tellers but now lost to the demanding volume of booming post-war consumer banking. Just as the experienced, small-town teller once knew everyone's business well enough to ignore the mundane but sniff out any funny business, behavior monitoring systems get to know accounts and customers, recognize usual behavior and become wary of out-of-character, risky behavior.

Behavior monitoring is a simple idea, but human-like common sense is nearly impossible to program into today's computers. Instead, behavior monitoring systems are trained with historical data. Programmed to distill patterns from histories of account use, modern fraud management systems learn by vast and detailed experience when to call for human investigation, or even when to block payment transactions during on-line authorizations. Today's best artificial intelligence systems are usually able to catch fraud sequences after one or two transactions, even if those transactions are not outlandish. So, the fraudster gets less per account and has to work harder compromising more accounts to keep up his lifestyle or meet his boss' expectations.

Faced with a need to compromise more accounts, fraudsters have learned too. Whether by keen wits or an unnatural sort of natural selection, fraudsters have adapted as protective systems have improved. Foremost, they have learned that consumer financial systems run largely independently; that information about consumers is incomplete, slow to move and often not shared after an account has been opened. Exploiting these vulnerabilities, fraudsters have learned to steal information about consumers instead of information about individual accounts. After all, if you steal information about one account, you may get away with one, two, or maybe three transactions on that account. If you steal critical information about an accountholder, you may be able to compromise several existing accounts and open some new ones as well.

In practice, this move up the food chain for fraudsters is seen as identity theft, social engineering, phishing, pharming, and plain-old mail theft. Identity theft is successful when sufficient information is stolen to completely hijack a person's credit-contracting capacity—at least where a face-to-face interview is not required. Common means of identity theft are compromising employee records from a private company, stealing a completed credit application (especially a mortgage application), buying genuine credit reports through a cooperating or coerced merchant (or employee), posing as a credit-granting merchant and buying credit reports on false pretenses, or impersonating a consumer who requests their own credit report for verification purposes; or, a thousand other variations and still others yet to be conceived.

Social engineering is a catchall term for a wide range of confidence-games relying upon gullibility, naivete, or simple civility to extract information from a consumer or a financial service employee. Usually a seemingly innocent piece of information is extracted that, when combined with some other seemingly innocent information, opens a door to a complete personal financial story.

Social engineering requires some skill—at least a gift for gab—and takes time and luck. But productivity-conscious fraudsters have turned to technology. Now, instead of 25 phone calls to compromise one consumer in a half-day's work, technology can deliver 25,000 e-mail messages yielding nearly 100 compromised identities, with PINs and passwords, in the same half day. Called phishing, this is but one of many approaches to automating old-fashioned con games to obtain access to multiple accounts.

A few technically proficient fraudsters engage in pharming; using viruses and other malicious programming to redirect consumers' computers so that those who think they are connecting to World Famous Giant Bank are in fact typing their secrets into identical forms on Nefarious Ned's Kitchen Website.

Overall, there are about as many ways to compromise personal financial information as there are fraudsters trying to do it. And, since fraud is a highly organized business, whenever a trick works well, it spreads rapidly and widely until the consumer finance industry plugs that hole and starts guessing where the next one will be.

Behavior monitoring for fraud is essential in the overall protective scheme because it's largely independent of the many means of fraud, focusing instead on what is done with accounts rather than how it is done. This independence from the details of the fraud method makes behavior monitoring the key to getting ahead of rapidly evolving fraud.

The weakness of behavior monitoring is those one, two, or sometimes three fraudulent transactions that get by before the system and its human operators recognize the threat and respond. If, say, two transactions for each account are fraudulent and an identity theft involves five accounts, the typical loss is ten transactions of larger-than-average (but not astronomical) size—perhaps £7,000.

On the other hand, if two or three transactions per identity are compromised, even if multiple accounts are involved, losses will be in the £1,400 range—maybe not even worth giving up honest work. The Fraud Clearinghouse proposed here is designed to stop frauds after one or two transactions per compromised identity rather than after one or two transactions per account compromised, thus keeping incident costs nearer to £1,400 than to £7,000. By sharing information between financial institutions, the Fraud Clearinghouse will allow behavior-monitoring systems to look across the accounts held by an individual consumer and prevent fraudsters from hiding among isolated accounts.

Of course, it is the sharing of financial information in credit bureaus that makes it possible for a fraudster to steal from multiple accounts by compromising a single identity. Sharing information has its security risks as well as it rewards. That's why it's important that sharing information for fraud is done properly. The system proposed here is one way to share account information properly, thus reducing fraud while not opening new fraud opportunities.

In one implementation, a method for detecting likely fraud in a financial system is disclosed. The method includes obtaining from a first financial organization first information relating to a first financial account indicative of financial performance for the first financial account, obtaining from a second financial organization independent of the first financial organization second information relating to a second financial account indicative of financial performance for the second financial account, and determining if the first financial account and the second financial account relate to a common customer, and if they do, analyzing the first information and the second information to determine a likelihood of fraud in one of the accounts. The financial accounts may be credit accounts. Also, the first information and the second information may not be personally identifiable.

In some aspects, the method may further include providing to the second financial organization a fraud indicator. The fraud indicator might not contain any personally identifiable information, and the fraud indicator might not provide any indication of the identity of the first financial organization.

In some aspects, the information relating to a second financial account can correspond to account registration information, to behavior sharing information, and to applications sharing information. The first financial account and the second financial account may be associated with a single individual. Also, the first financial account may be associated with a first individual and the second financial account may be associated with a second individual having a predetermined relationship to the first individual.

The details of one or more embodiments of the invention are set forth in the accompanying drawings and the description below. Other features, objects, and advantages of the invention will be apparent from the description and drawings, and from the claims.

DETAILED DESCRIPTION

Design Features

The clearinghouse system described here may exhibit a number of features. For example, the system may have forward summarization through "profiles," where genuine behavior with payment and credit products is highly varied—so varied that the difference between genuine and fraudulent behavior is less than the normal variation in genuine behavior alone. To compensate, a behavior monitoring system may learn the behavior of each individual account and compare new behavior versus old to provide a context for successful pattern recognition, much like current best-deployed systems. As one example, systems may use, and have in the past used, models of individual account behavior called "profiles" for this purpose. Each profile is a highly summarized series of coefficients for a long equation that describes an account's behavior and evolution.

An account's profile can be updated with each new transaction before the riskiness of that transaction is assessed. The result is the same as if a full transaction history were maintained and read into the behavior analysis before each new assessment of risk. But, the profile approach may be more efficient because historical activity is mathematically digested as the activity is experienced, not after the fact and repeatedly every time a new transaction is assessed.

Profiles are a good mechanism for sharing account behavior information between organizations. By their nature, they can be implemented to carry only the behavior information relevant to detection of fraud, and no other information. They can be the shortest possible summarization containing the information needed to detect fraud. And they can be efficient and fast to use as inputs to behavior monitoring neural networks and other models, and also can be unreadable by humans without documentation and additional data.

By summarizing transaction information immediately into profiles, the described clearinghouse avoids keeping information it doesn't need that might be subject to compromise, and it provides an efficient storage medium for fraud detection purposes. However, more detailed data storage may also be used in appropriate situations, depending on the needs of the particular system.

The system may also be configured to employ isolated personal information. To protect personal information from improper disclosure, a clearinghouse may be designed to contain no personally identifiable information whatsoever. There may be no names, addresses, account numbers, and/or mothers' maiden names in the clearinghouse proper. All or some personal information may be kept in a separate server called a Registration Server, but that server may be configured to not transmit personal information. It can be used only to see if the holder of a newly registered account already has other accounts on file in the Clearinghouse and if similar identification has been associated with a fraud.

The system may also be configured to maintain contributor anonymity. To maintain competitive neutrality, the identity of the participating institution contributing information about an account can be kept confidential. Only that institution can be provided with the necessary identifying number to modify information about a registered account and no other institutions receive information about contributor identities.

Embargoed profiles may also be employed. A clearinghouse design may allow for accumulating information into embargoed profiles that are not distributed. This mechanism may be used to prevent distribution of inaccurate information if contributions have been erroneous and to hide the identity of contributors when a process of elimination could identify them.

Harmless error recovery may be another provided feature. Profiles can present a problem when they are given bad information: one cannot rollback a profile in a simple way. Instead, the policy of a clearinghouse may be to embargo any profile found to be erroneous or questionable. When necessary, individual, past transactions can be reversed by reconstructing a profile off-line from the transaction logs maintained on clearinghouse activity.

Operation

The proposed clearinghouse may be configured to be capable of one or more of three main types of transactions: account registration, behavior sharing, and application sharing. Application sharing is a special case of account registration, so we will start by describing account registration and behavior sharing, then return to describe the special aspects of application sharing.

Account Registration

The account registration process allows a participating institution to identify a particular customer, and an account held by that customer, which the participant wishes to share with other clearinghouse participants.

The registration process may be a simple exchange. The participant can send identifying details about the subject customer and the account involved. The server may then use the identifying information to search against records of previously registered customers. If a match is found, the new account can be linked with those previously registered for the customer. In either case, a unique numeric identifier is returned to the registrant to use as a reference to the account and customer in the future.

Participating institutions may use the account registration process to register new accounts. The process can return a numeric identity handle from a system server for use by the institution when accessing profiles about the subject consumer(s). (A registration server instead of the fraud clearinghouse may be used for this process so that the clearinghouse does not contain any personal information.) Each institution accessing the same consumer's profiles is given a different access handle. In addition to the handle, an encryption key is returned for use in accessing profiles obtained for the subject consumer. Receipt of the handle does not tell the participating institution whether or not other institutions have registered the same consumer. This can be learned only by contributing transactions and accessing profiles in the Clearinghouse.

Steps to enable encryption and system maintenance logs are not described here for simplicity, and will be known to a skilled artisan. The steps by each entity for registration may include:

Participating Institution:

1. Build a registration request composed of a participating institution identifier, a participating institution key, an account type indicator, a participant's account identifier (but not the real account number!), and customer identity information or a previously received account identifier for the same accountholder.

2. Send registration request to Registration Server via a secure channel.

Registration Server:

1. Search for supplied account identifier or identity information to get internal identity identifier of accountholder, or if no match is found, create a new internal identity identifier.

2. Return account identifier and account encryption key.

3. Communicate account identifier, account type indicator, account encryption key and internal identity identifier to the Fraud Clearinghouse.

Participating Institution:

1. Receive and store account identifier and account encryption key.

Behavior Sharing

Once an account has been registered, the participant that registered the account can access shared profiles for the subject customer (which may be, for example, an individual, a group of individuals, or an organization such as a company), but only when the participant updates information about the registered account. To invoke this exchange, the participant sends a message to the clearinghouse that contains the identifier obtained when the account was registered and a record that describes a transaction on that account. The clearinghouse uses the transaction record to update the profile about the subject account and returns that profile along with all others for the same customer.

Details of the behavior sharing transaction are described next. Participating institutions use this process to send transaction records and receive back profiles of account behavior for all accounts registered for the subject consumer. Access to this process requires use of an identity handle provided in the Registration Process described above. Steps to enable encryption and system maintenance logs are not described here for simplicity, as will be understood by a skilled artisan. Certain terms are defined below. The steps by the various participants include the following.

Participating Institution

1. Construct a transaction description record containing participating institution identifier, account identifier, and transaction information.

2. Send the transaction description record to the Fraud Clearinghouse.

Fraud Clearinghouse

1. Enqueue the transaction description record for processing in first-in-first-out order with respect to other transactions involving the same accountholder.

2. Use the account identifier, to retrieve the internal identity identifier and account type indicator.

3. Read and lock the accountholder profile for the accountholder and perform a profile update the accountholder profile using the transaction information received. Then, unlock the accountholder profile.

4. Return the accountholder profile for the subject accountholder to the requesting participating institution.

Participating Institution

1. Receive and use the accountholder profile for better fraud detection.

Application Sharing

The registration server can share information about applications for credit and new account openings as well. The purpose of application information sharing is to examine applications in the name of a customer for consistency and changes. Also, residence addresses and telephone numbers in applications are checked against prior applications and especially applications reported to have been probable frauds.

The application sharing process returns status flags about the outcome of a search. Using a process similar to account registration, the registration server searches for matching records and returns one or several codes about what it has found.

The matching process reports on "exact," "equivalent" and "near" matches on the entire identity record supplied. Matches are reported for the same and different names. Also, matches on other active and inactive customers are reported as well as matches on records previously involved in frauds.

From the response of the application sharing process, a participating institution might not be able to determine for certain if an identity is genuine, but it is able to determine if additional investigation and verification of the application is warranted. That determination is normally made by an automated system with yet another model used to assess the importance and implications of registration server responses.

Other Features

There are a variety of other interactions between participants and the clearinghouse, including closing an account, unregistering an account created in error, breaking the association of accounts with a specific customer, removing account identifiers in the event of a security breech, reporting an account that either failed to ever make any payments or which is identified as a probable fraud, and a variety of housekeeping and maintenance transactions.

DEFINITIONS

Account identifier—A unique identifier returned by the Registration Server to a registering participating institution to identify an account.

Account type indicator—Uniquely identifies the type of an account being registered.

Accountholder—An individual, household, business, or other organization which obtains and uses a financial services or trade account with a participating institution.

Accountholder profile—A dense mathematical representation of the current, recent, and/or past behavior of the accounts held by the subject accountholder.

Fraud Clearinghouse—A server accessible throughout its market area providing participating institutions the ability to share information about the behavior of individual account holders for the purpose of protecting against fraud.

Internal identity identifier—A unique identifier created by the registration server and used by the fraud clearinghouse to identify an individual accountholder. The internal identity identifier is never distributed outside the registration server and fraud clearinghouse in certain implementations.

Identity information—The package of information needed to identify an accountholder in the identity area where the accountholder resides. As accountholders may be different types of entities, identity information usually specifies the type of entity (person, household, business, etc.) and its content may differ for different types of entities.

Participating institution—An organization that provides consumer services requiring protection from fraud and which has contracted with the provider for use of the fraud clearinghouse.

Participating institution identifier—A globally unique identifier assigned by the provider that identifies the participating institution.

Participant's account identifier—Identifier of a registered account that is unique to the participating institution and supplied by the participating institution.

Profile update—Updates of profiles are performed for transactions which carry information about the behavior of accounts held by a subject accountholder. Most updates involve the calculation of new variable values within the accountholder profile based upon the details of the described transaction.

Registration request—A package of information necessary to initiate the registration process. Includes a participating institution identifier, identity information, an account type indicator and an account identifier.

Registration server—A server dedicated to the registration process described here. Uses commercially available data on identities.

Transaction description record—Record describing a transaction made on a specific account.

Transaction information—Information about a subject transaction in a transaction description record. The transaction information may take many different forms depending upon the type of account involved, the type of transaction and the content of the associated accountholder profile.

A number of embodiments of the invention have been described. Nevertheless, it will be understood that various modifications may be made without departing from the spirit and scope of the invention. Accordingly, other embodiments are within the scope of the following claims.

What is claimed is:

1. A method comprising:
    obtaining, at a registration server system from a first financial organization, a first financial account registration request, the first financial account registration request including first personally identifiable information for an accountholder of a first financial account managed by the first financial organization, wherein the registration server system includes a processor;
    determining, by the registration server system, an internal identity identifier for the accountholder based on the first personally identifiable information in the first financial account registration request;
    generating, by the registration server system, a first account identifier that is associated with the internal identity identifier;
    transmitting by the registration server system to the first financial organization the first account identifier;
    transmitting, by the registration server system, to a fraud clearinghouse server system a communication including the first account identifier and the internal identity identifier, wherein the fraud clearinghouse server system includes a processor;
    obtaining, at the fraud clearinghouse server system, from the first financial organization a first transaction description record for the first financial account, the first transaction description record including (i) the first account identifier and (ii) first transaction information indicative of a first financial performance for the first financial account;
    identifying, by the fraud clearinghouse server system, a first profile for the first financial account by identifying a profile that is associated with the obtained first account identifier;
    updating, by the fraud clearinghouse server system, the first profile using the first transaction information indicative of the first financial performance for the first financial account;
    identifying, by the fraud clearinghouse server system, the internal identity identifier as associated with the obtained first account identifier;
    identifying, by the fraud clearinghouse server system, other profiles for the accountholder at financial organizations independent of the first financial organization by identifying profiles associated with the internal identity identifier; and
    transmitting, by the fraud clearinghouse server system, to the first financial organization, the updated profile and the other profiles.

2. The method of claim 1, wherein the first financial account is a credit account.

3. A system, comprising:
a registration server system including a processor configured to:
receive financial account registration requests from financial organizations, each financial account registration request including accountholder identifying information for an accountholder of a financial account managed by a financial organization; and
determine for each received registration request an internal identify identifier for the accountholder based on the identifying information, the internal identity identifier determined by searching records of previously registered financial account using the identifying information;
generate for each received registration request an account identifier that is associated with the determined internal identity identifier; and
transmit for each received registration request to a financial organization the generated account identifier; and
a fraud clearinghouse server system including a processor configured to:
receive from the registration server system communications that each include an account identifier and an internal identity identifier;
receive from each financial organization a transaction description record that includes (i) an account identifier received from the registration server and (ii) transaction information indicative of a financial performance for a financial account, the transaction description record containing no personally identifiable information if in an unencrypted format;
identify for each received account identifier in a transaction description record a profile that is associated with the account identifier;
update the identified profile for each received account identifier based on the transaction information;
identify for each received account identifier an associated internal identity identifier and multiple profiles that are associated with the identified internal identity identifier; and
transmit to each financial organization the updated profile and the identified multiple profiles.

4. The system of claim 3, wherein the registration server system is adapted to generate account encryption keys for transmission of anonymous information.

5. The method of claim 1, wherein determining the internal identity identifier includes searching records of previously registered financial accounts using the first personally identifiable information to identify an internal identity identifier associated with the first personally identifiable information.

6. The method of claim 1, wherein determining the internal identity identifier includes searching records of previously registered financial accounts using the first personally identifiable information and generating by the registration server system the internal identity identifier if no matching information for a previously registered financial account is found.

7. The method of claim 1, wherein the registration server system does not transmit personally identifiable information.

8. The method of claim 7, wherein the personally identifiable information includes a name, bank account number, or address of the account holder.

9. The method of claim 1, wherein the fraud clearinghouse server system is configured to contain no contain personally identifiable information if in an unencrypted format.

10. The method of claim 9, wherein the personally identifiable information includes a name, bank account number, or address of the account holder.

11. The method of claim 1, further comprising:
obtaining at the registration server system from a second financial organization independent of the first financial organization a second financial account registration request, the second financial account registration request including second personally identifiable information for the accountholder of a second financial account;
determining by the registration server system the internal identity identifier for the accountholder based on the second personally identifiable information in the second financial account registration request;
generating by the registration server system a second account identifier that is associated with the internal identity identifier, the second account identifier different than then first account identifier;
transmitting by the registration server system to the second financial organization the account identifier;
obtaining at the fraud clearinghouse server system from the second financial organization a second transaction description record for the second financial account, the second transaction description record including (i) the second account identifier and (ii) second transaction information indicative of a second financial performance for the second financial account;
identifying by the fraud clearinghouse server system a second profile for the second financial account by identifying a profile that is associated with the obtained second account identifier;
updating by the fraud clearinghouse server system the second profile using the second transaction information indicative of the second financial performance for the second financial account;
identifying by the fraud clearinghouse server system the internal identity identifier as associated with the obtained second account identifier;
identifying by the fraud clearinghouse server system the first profiles for the accountholder at the first financial organization as associated with the internal identifier; and
transmitting by the fraud clearinghouse server system to the second financial organization the updated second profile and the first profile.

12. The method of claim 1, wherein the obtained first transaction description record is encrypted.

13. The method of claim 1, wherein the internal identity identifier is never distributed outside of the registration server system and the fraud clearinghouse server system.

14. The system of claim 3, wherein the registration server system does not transmit personally identifiable information.

15. The system of claim 14, wherein the personally identifiable information includes a name, bank account number, or address of the account holder.

16. The system of claim 3, wherein the fraud clearinghouse server system is configured to contain no contain personally identifiable information if in an unencrypted format.

17. The system of claim 16, wherein the personally identifiable information includes a name, bank account number, or address of the account holder.

* * * * *

UNITED STATES PATENT AND TRADEMARK OFFICE
CERTIFICATE OF CORRECTION

| | | |
|---|---|---|
| PATENT NO. | : 7,756,783 B2 | Page 1 of 1 |
| APPLICATION NO. | : 11/515323 | |
| DATED | : July 13, 2010 | |
| INVENTOR(S) | : Theodore J. Crooks | |

It is certified that error appears in the above-identified patent and that said Letters Patent is hereby corrected as shown below:

Column 1, line 1, in the Specification, below the title, insert -- CROSS-REFERENCE TO RELATED APPLICATIONS --.

Column 9, line 6, in Claim 3, after "including" delete "accountholder".

Column 9, line 10, in Claim 3, delete "identify" and insert -- identity --, therefore.

Signed and Sealed this

Nineteenth Day of October, 2010

David J. Kappos
*Director of the United States Patent and Trademark Office*